(Model.)
J. H. MANNING.
MANUFACTURE OF BUTTONS.
No. 286,620. Patented Oct. 16, 1883.
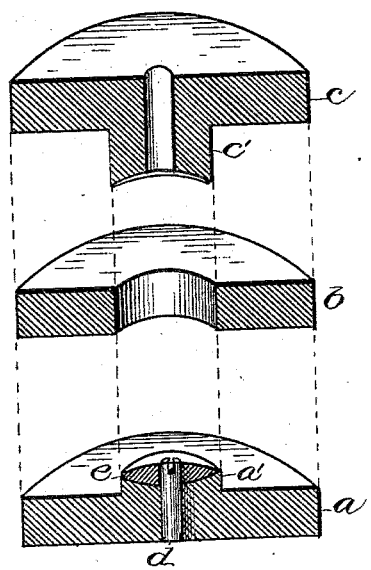
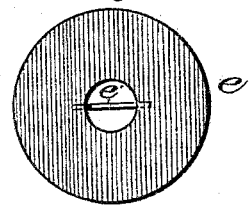
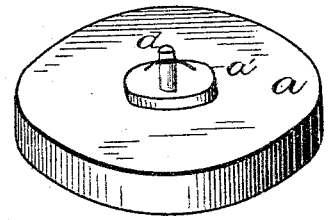
Attest
Inventor

UNITED STATES PATENT OFFICE.

JAMES H. MANNING, OF ALBANY, NEW YORK.

MANUFACTURE OF BUTTONS.

SPECIFICATION forming part of Letters Patent No. 286,620, dated October 16, 1883.

Application filed August 13, 1883. (Model.)

*To all whom it may concern:*

Be it known that I, JAMES H. MANNING, residing at Albany, State of New York, have invented certain new and useful Improvements in the Manufacture of Buttons; and I do hereby declare the following to be a full, clear, and exact description of said invention, sufficient to enable others skilled in the art to make and use the same.

My invention relates to the manufacture of buttons from plastic compositions, such as bonsilate, celluloid, or the like; and said invention consists in providing the button, having an eye or perforation, with a metal bar, which is embedded directly in the composition, and securely retained thereby across the eye in proper position to receive the sewing-thread.

Said invention further consists of certain improvements in method of and means for making buttons, wherein a cross-bar is embedded directly in the factitious material and made to extend across the eye or hole in the button, the nature of all of which will be first fully described, and thereafter distinctly pointed out in the claims.

In the accompanying drawings, Figure 1 is a sectional view of a three-part mold employed in making the buttons, the several parts being separated and shown in perspective. Fig. 2 is a perspective view of the base-plate of the mold detached; and Fig. 3, a plan or face view of the finished button, showing the cross-bar in position.

The mold for forming the individual button may consist, conveniently, of a base-plate, $a$, having a suitable die, as at $a'$, raised centrally thereon, and having a projecting pin, as at $d$, the upper end of which is transversely slotted to receive and retain the eye-bar $e'$ of the button in process of molding, as hereinafter described. The center plate, $b$, encompasses the die $a$, and has a central hole, which serves to steady the plunger $c$ when the same descends to compress the material in the mold. Said plunger-plate $c$ has a central perforation corresponding in diameter to that of pin $d$, so that no pressure shall be exerted on said pin during descent of the plunger.

The several mold parts, hereinabove described, having been mounted in the usual press, as well understood, the operation is as follows: In the center of the base-plate $a$, that molds the face of the button, is placed the metallic pin $d$, having a slotted head or end, said pin projecting above the base-plate a distance equal to the required thickness of the button that is to be made. A piece of wire, the diameter of which may be approximately the same as the width of the slot in the pin $d$, and having its ends slightly bent, is laid in the said slot, the bended ends pointing downward or toward the face of base-plate of the mold. In lieu of a single slot, there may be cross-slots in said pin $d$, which will seat double eye-bars crossing each other at right angles, when such bars are desired in the finished button. The plastic material to be molded is placed in the die $a$, formed to receive it. The plunger $c$, adapted to snugly fit said die $a$, and provided with a hole in its center equal to the diameter of the pin $d$, is then brought down against the die, and by hydraulic or other pressure and heat the plastic material is reduced to a compact mass. It is clear that the pressure is exerted evenly upon all parts of the material, except that, owing to the hole in the plunger $c'$, there is no pressure upon the pin $d$, nor upon that part of the metal bar $e'$ resting within the slot of said pin. Consequently, while the material is welded firmly about the bended ends of the metal bar $e'$, the middle portion thereof, constituting the cross-bar, presents a clean surface when the plunger $c$ is removed. The finished button, being raised from off the pin $d$, is shown to have a hole running centrally through it from front to back face, said hole being the same in diameter as that of the pin $d$. As the button is lifted, the cross-bar $e'$ frees itself from the metal pin $d$, the middle section of said bar being displayed to view across the perforation, while the bended ends thereof are firmly embedded in the body of the button.

Heretofore in buttons formed from plastic compositions the use of a metal bar extending across the central perforation of the button and serving to sustain the sewing-threads has been attempted. Such a bar has many obvious advantages over a series of plain perforations in the button, not merely because of its finish, but, being smoother and polished, has much less tendency to cut the threads than the sharp, rough angles of the older forms; but prior to my invention the cross-bar was secured to an eyelet, and it was the eyelet, with the bar attached, which was embedded in the body of the button, whereas as now designed this eyelet and all expense of making the same and securing the cross-bar thereto are dispensed with, said bar being directly embedded in the composition in a firm and effective manner.

A button thus constructed is cheaper to produce and is stronger than buttons having drilled eyes. It requires less thread, and by reason of the depth of its eye or central perforation serves to hide the thread, so that if this should become faded no unsightly appearance is presented. By reason of the breadth of the opening on each side of the cross-bar the button can be easily applied to the fabric by machine-stitching, and in this particular is distinctly superior to the older types of button heretofore in vogue.

It is obvious that other mechanical means may be employed equivalent to the foregoing and for the introduction of the metallic cross-bar in buttons, so that I do not confine myself to the precise apparatus herein detailed.

Having thus described my invention, what I claim as new, and desire to secure by Letters Patent, is—

1. As a new article of manufacture, a button formed from plastic composition, and having a bar embedded directly therein, which said bar extends across the hole in the button, substantially as described.

2. The process of making buttons from plastic composition, which consists in disposing the material in the mold about a central pin and cross-bar, and then subjecting the material to severe compression, sufficient to firmly embed said bar within the body of the material and to form a perforation across which the bar extends, substantially as described.

3. The combination, with the die and plunger, of a pin projecting from said die, and having a slotted end to seat the cross-bar in position to be embedded in the button, substantially as described.

4. The combination, with the base-plate $a$, the die $a'$, and pin $d$, having its end slotted, of the force-plate $c$ and perforated plunger $c'$, substantially as described.

In testimony whereof I have hereunto set my hand this 7th day of August, A. D. 1883.

JAMES H. MANNING.

Witnesses:
CHAS. M. ATWOOD,
WILLIAM LERCH.